(12) United States Patent
Hashimoto et al.

(10) Patent No.: US 7,200,284 B2
(45) Date of Patent: Apr. 3, 2007

(54) DATA PROCESSING APPARATUS AND DATA PROCESSING METHOD

(75) Inventors: Hideyuki Hashimoto, Toyokawa (JP); Hiroshi Sugiura, Hoi-Gun (JP); Yoshikazu Ikenoue, Itami (JP)

(73) Assignee: Minolta Co., Ltd., Osaka (JP)

( * ) Notice: Subject to any disclaimer, the term of this patent is extended or adjusted under 35 U.S.C. 154(b) by 688 days.

(21) Appl. No.: 10/270,286

(22) Filed: Oct. 15, 2002

(65) Prior Publication Data

US 2003/0072498 A1 Apr. 17, 2003

(30) Foreign Application Priority Data

Oct. 17, 2001 (JP) ............... 2001-319669

(51) Int. Cl.
*G06K 9/36* (2006.01)
(52) U.S. Cl. ...................... 382/286; 382/168
(58) Field of Classification Search ................ 382/100, 382/162, 168, 173, 286, 305; 358/3.26, 3.28, 358/520
See application file for complete search history.

(56) References Cited

U.S. PATENT DOCUMENTS

| | | | | |
|---|---|---|---|---|
| 5,832,140 A | * | 11/1998 | Stapleton et al. | ........... 382/298 |
| 5,974,203 A | * | 10/1999 | Tadokoro et al. | ........... 382/309 |
| 6,018,726 A | * | 1/2000 | Tsumura | .................... 705/412 |
| 6,101,526 A | * | 8/2000 | Mochizuki | .................. 709/200 |
| 6,223,231 B1 | * | 4/2001 | Mankude | .................... 710/38 |
| 6,801,567 B1 | * | 10/2004 | Schmidl et al. | ............. 375/149 |
| 6,819,944 B1 | * | 11/2004 | Sato | ........................... 455/566 |

FOREIGN PATENT DOCUMENTS

| | | |
|---|---|---|
| JP | 10-63751 | 3/1998 |
| JP | 11-138921 | 5/1999 |
| JP | 11-317987 | 11/1999 |
| JP | 2000-151883 A | 5/2000 |
| JP | 2000-218907 | 8/2000 |

* cited by examiner

*Primary Examiner*—Kanjibhai Patel
(74) *Attorney, Agent, or Firm*—Morrison & Foerster LLP

(57) ABSTRACT

A data processing apparatus includes a receiver which receives data transmitted from a terminal, a processor which processes the data received by the receiver, and a transmitter which transmits contents processed by the processor to the terminal.

14 Claims, 17 Drawing Sheets

TOTAL NUMBER OF PIXELS : 34,799,360
MAXIMUM NUMBER: 240
MINIMUM NUMBER: 15
MEAN VALUE: 115
MAXIMUM FREQUENCY: 100
DISTRIBUTION: 10.15
NUMBER OF ISOLATED POINTSPROCESSING TERMINAL: 3,342,751

(A)

| PROCESS HISTORY (BASIC) | | |
|---|---|---|
| ID | OPERATION | OPERATION TIME |
| 0 | OP1 | 5 |
| 1 | OP2 | 10 |
| 2 | OP1 | 5 |
| ⋮ | ⋮ | ⋮ |
| N | OP5 | 4 |

PROCESSING (B)

| PROCESS HISTORY (IN ORDER OF LONGER OPERATION TIME) | | |
|---|---|---|
| ORDER | OPERATION | OPERATION TIME |
| 1 | OP2 | 25 |
| 2 | OP3 | 15 |
| 3 | OP1 | 14 |
| ⋮ | ⋮ | ⋮ |
| n | OP7 | 2 |

(C)

| PROCESS HISTORY (IN ORDER OF LARGER NUMBER OF OPERATION) | | |
|---|---|---|
| ORDER | OPERATION | NUMBER OF OPERATION |
| 1 | OP1 | 5 |
| 2 | OP3 | 4 |
| 2 | OP2 | 4 |
| ⋮ | ⋮ | ⋮ |
| n | OP8 | 1 |

| A00 | A10 | A20 | A30 | | AL0 |
|-----|-----|-----|-----|-----|-----|
| A01 | A11 | A21 | A31 | | AL1 |
| A02 | A12 | A22 | A32 | | AL2 |
| A03 | A13 | A23 | A33 | | AL3 |
| | | | | | |
| A0N | A1N | A2N | A3N | | ALN |

| A** | : IMAGE IS GOOD | | A** | : IMAGE IS POOR |

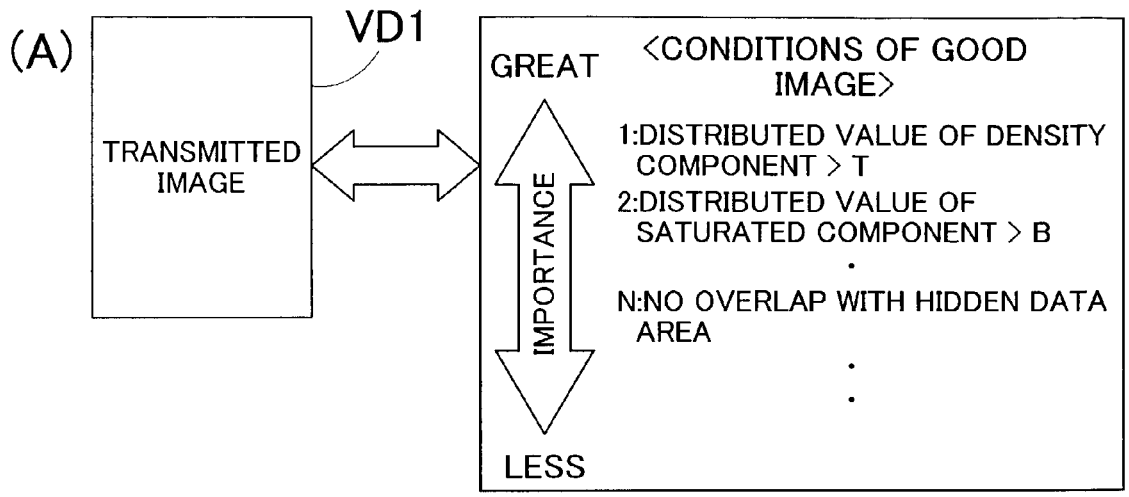

TRANSMITTED IMAGE — VD1

GREAT ↕ IMPORTANCE ↕ LESS

<CONDITIONS OF GOOD IMAGE>
1: DISTRIBUTED VALUE OF DENSITY COMPONENT > T
2: DISTRIBUTED VALUE OF SATURATED COMPONENT > B
·
N: NO OVERLAP WITH HIDDEN DATA AREA
·
·

<IMAGE QUALITY DISCRIMINATION RESULTS>

| < ITEM > | <RESULT> |
|---|---|
| 1: DISTRIBUTED VALUE OF DENSITY COMPONENT > T | OK |
| 2: DISTRIBUTED VALUE OF SATURATED COMPONENT > B | NG |
| · | · |
| N: NO OVERLAP WITH HIDDEN DATA AREA | OK |
| · | · |
| · | · |
| · | · |

(B) <CONDITIONS OF REGENERATION>

| < CONDITIONS > | < CHANGE > |
|---|---|
| 1: SENSITIVITY OF R COMPONENT | NO |
| 2: SENSITIVITY OF G COMPONENT | YES |
| · | · |
| n: RE-OPERATION OF SERVICE ADJUSTMENT 1 | YES |
| n+1: RE-OPERATION OF SERVICE ADJUSTMENT 1 | NO |
| · | · |
| · | · |
| · | · |

FIG. 12

DATA PROCESSING APPARATUS AND DATA PROCESSING METHOD

This application claims priority to Japanese Patent Application No. 2001-319669 filed on Oct. 17, 2001, the disclosure of which is incorporated by reference in its entirety.

BACKGROUND OF THE INVENTION

1. Field of the Invention

The present invention relates to a data processing apparatus and a data processing method to be applied to an image data print service and so on.

2. Description of Related Art

In a current situation in which information terminal networking has been developing, various systems for executing data processing or managing data by another apparatus are known.

For example, U.S. Pat. No. 6,223,231 discloses technology in which a secondary server succeeds a job of a primary server when the primary server which is processing I/O demands breaks down. Japanese Unexamined Laid-open Patent Publication No. H11-317987 discloses technology that enables a user to control another apparatus connected to a network by using the image information displayed on the terminal display.

Furthermore, Japanese Unexamined Laid-open Patent Publication No. H10-63751 discloses technology that divides processing into a plurality of divided processing and changes the sequence of the divided processing.

Japanese Unexamined Laid-open Patent Publication No. 2000-218907 discloses technology in which image data quality is discriminated at the time of printing the image data and the outputting of the image data is suspended when it is discriminated that the quality is poor. Furthermore, Japanese Unexamined Laid-open Patent Publication No. 1999-138921 discloses technology in which image quality is discriminated at the time of outputting the image and the output is suspended when it is discriminated that the quality is not within the predetermined tolerance.

Now, in a print service system in which a user sends an image data created by using a personal computer to a data processing apparatus of a print server and the print server executes the processing of the image data in accordance with the user's requests, if the image data sent from the user includes abnormalities, the processing of the image data at the print server may cause troubles. In such a case, it is required for a user to regenerate the image data so that the image data can be properly processed. In order to perform the reproduction efficiently, the user desires to know the processing contents performed by the print server.

However, in the prior art technology, the job transferring or the change of job processing sequence is merely controlled, or the output is merely suspended depending on the discriminated image quality. Therefore, even if the prior art technology is applied to the aforementioned print service system, a user can only know the processed results. Accordingly, the user cannot know how to regenerate the image data, and therefore the regeneration cannot be performed efficiently.

SUMMARY OF THE INVENTION

An object of the present invention is to provide a data processing apparatus capable of efficiently regenerating a data at a terminal in cases where abnormalities occurred or it is predicted that abnormalities occur at the time of processing the data transmitted from the terminal or before the processing.

Another object of the present invention is to provide a data processing method capable of efficiently regenerating a data at a terminal in cases where abnormalities occurred or it is predicted that abnormalities occur at the time of processing the data transmitted from the terminal or before the processing.

According to the first aspect of the present invention, a data processing apparatus includes a receiver which receives a data transmitted from a terminal, a processor which processes the data received by the receiver, and a transmitter which transmits contents processed by the processor to the terminal.

With this data processing apparatus, when the data transmitted from the terminal are received, the data is processed and the processed contents are transmitted to the terminal. In other words, in cases where abnormalities occurred due to the processing, the processed contents are transmitted to the terminal. Therefore, the user using the terminal can know the processed contents. This enables the user to regenerate the data so that abnormalities do not occur, resulting in efficient data regeneration.

According to the second aspect of the present invention, a data processing apparatus includes a receiver which receives a data transmitted from a terminal, a processor which processes the data received by the receiver, a discriminator which discriminates whether abnormalities occur due to the processing by the processor, a calculator which calculates conditions for regenerating the data which do not cause abnormalities even if the processor processes the data when the discriminator discriminates that abnormalities occur, and a transmitter which transmits the conditions calculated by the calculator to the terminal.

With this data processing apparatus, the data processing is performed when the data transmitted from the terminal is received, and when it is discriminated that abnormalities occur, data regeneration conditions which do not cause abnormalities by the processing is calculated. Then, the data regeneration conditions are transmitted to the terminal. In other words, in cases where it is discriminated that abnormalities occur when the data processing of the received data is performed, necessary data regeneration conditions are transmitted to the terminal. Accordingly, the user using the terminal can know the data regeneration conditions, and therefore can regenerate the data according to the regeneration conditions. Thus, data regeneration can be performed efficiently.

According to the third aspect of the present invention, a data processing method includes: receiving data transmitted from a terminal; processing a received data; discriminating whether abnormalities occur by the processing of the received data; and transmitting processed contents to the terminal when it is discriminated that abnormalities occur.

With this data processing method, in cases where it is discriminated that abnormalities occur by the processing of the received data, the processed contents are transmitted to the terminal. Therefore, the user using the terminal can know the processed contents, which enables the user to efficiently regenerate the data.

According to the fourth aspect of the present invention, a data processing method, includes: receiving a data transmit ted from a terminal; processing the received data; discriminating whether abnormalities occur due to the processing of the data; calculating conditions for regenerating the data that do not cause abnormalities when it is discriminated that abnormalities occur; and transmitting the calculated conditions to the terminal.

With this data processing method, if it is discriminated that abnormalities occur due to the processing of the data, conditions for regenerating the data that do not cause abnormalities are calculated and the calculated conditions are transmitted to the terminal. Therefore, the user using the terminal can know the data regeneration conditions and can efficiently regenerate the data.

Other objects and the features will be apparent from the following detailed description of the present invention with reference to the attached drawings.

BRIEF DESCRIPTION OF THE DRAWINGS

The present invention will be more fully described and better understood from the following description, taken with the appended drawings, in which:

FIG. 4 is an explanatory drawing of the data process history information;

FIG. 6 is an explanatory drawing showing a discrimination of the image quality by dividing the image data area;

FIG. 12 is an explanatory drawing for a creation of regeneration conditions of an image data;

DETAILED DESCRIPTION OF THE PREFERRED EMBODIMENTS

Figure 1:
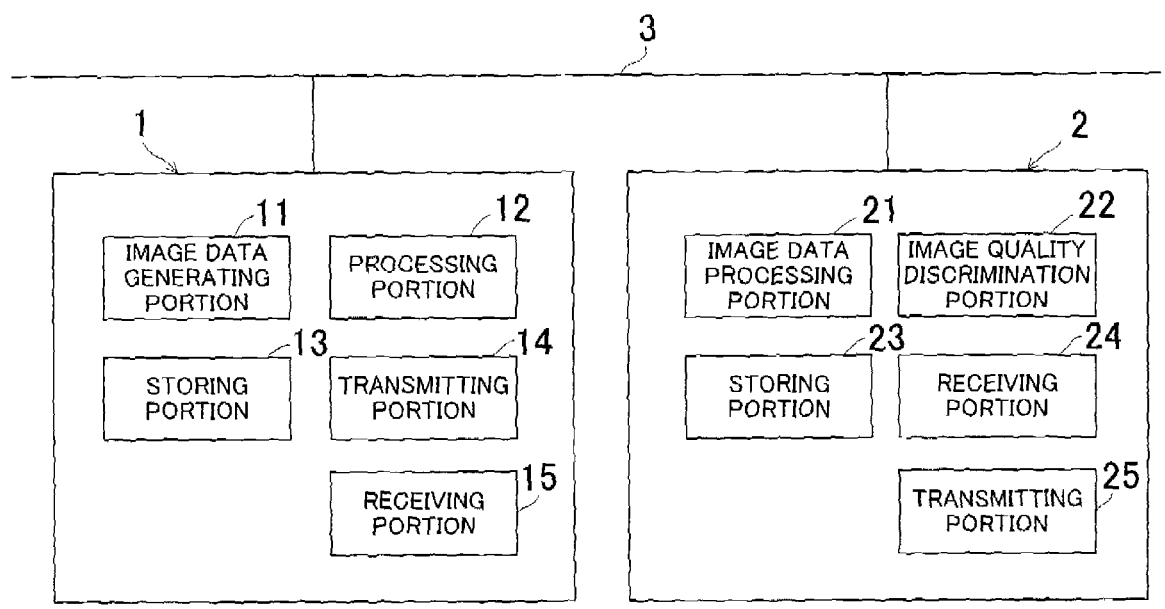
FIG. 1 is an entire structural view showing an image processing system equipped with a data processing apparatus according to the first embodiment of the present invention.

FIG. 1 is an entire structural view showing an image processing system equipped with a data processing apparatus according to the first embodiment of the present invention.

In FIG. 1, this image processing system is equipped with a terminal 1 and a data processing apparatus 2. The terminals 1 and the data processing apparatuses 2 are connected with a network 3, and can transmit and receive data each other.

The terminal 1 corresponds to a user/client who requests image data processing. On the other hand, the data processing apparatus 2 processes the image data transmitted from the terminal 1.

The terminal 1 is constituted by, for example, a personal computers (hereinafter referred to as "PC"), and equipped with an image data generating portion 11, a processing portion 12, a storing portion 13, a transmitting portion 14, a receiving portion 15, etc.

The image data generating portion 11 generates an image data from an image created by a user on a screen of a display apparatus, an image taken by a digital camera or another image.

The processing portion 12 executes a predetermined processing to a generated image data using software and the like in accordance with the request of a user, if required.

The storing portion 13 is comprised of a storing apparatus such as a hard disk, and stores the generated image data and its generation conditions or the like such as the information regarding the image quality at the time of the image generation. This storing portion 13 may be provided in a storing server connected to the network 3.

Figure 2:
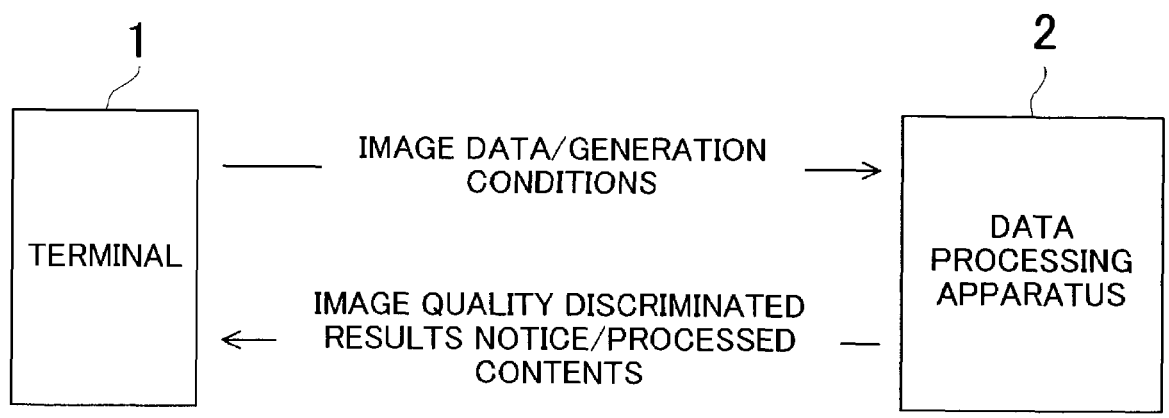
FIG. 2 shows a data flow in the image processing system.

The transmitting portion 14 transmits the generated image data to the data processing apparatus 2 together with the generation conditions of the image data, if necessary, as shown in FIG. 2.

The receiving portion 15 receives the data from the data processing apparatus 2.

On the other hand, the data processing apparatus 2 is constituted by a computer, and is equipped with an image data processing portion 21, an image quality discrimination portion 22, a storing portion 23, a receiving portion 24 and a transmitting portion 25.

The processing portion 21 executes a predetermined processing to the image data transmitted from the terminal 1 for improving the image quality with reference to the information such as the image generation conditions transmitted together with the image data, if necessary. In the operation, the data is converted using statistical information. The statistical information may be created by the processing portion 21 based on the transmitted image data or the like. Alternatively, the statistical information may be created at the terminal side and sent to the data processing apparatus 2.

Figure 3:
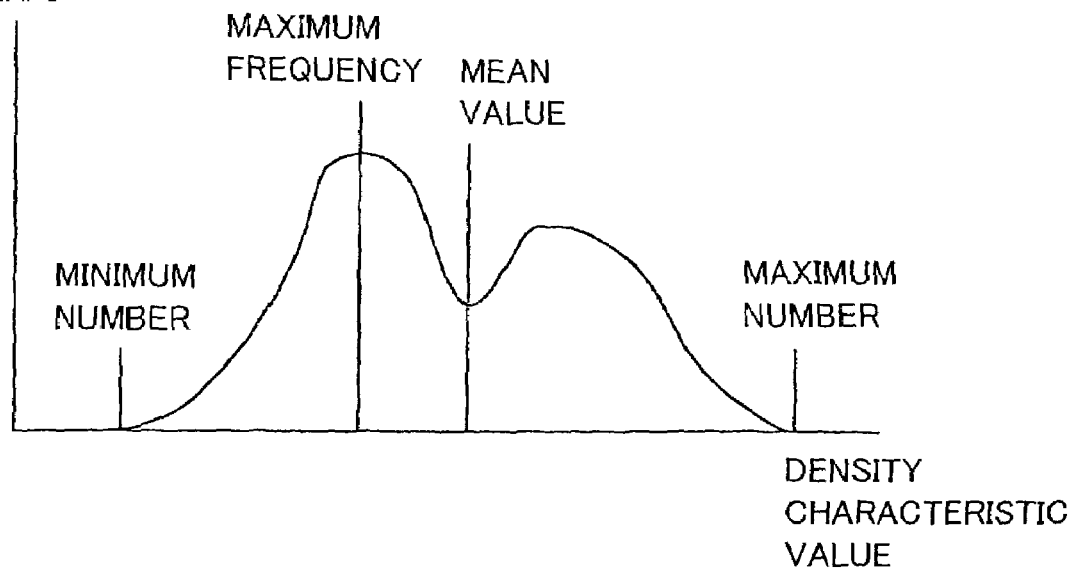
FIG. 3 is a graph showing an example of a concentration distribution of an image to be used for data processing information.

FIG. 3 is a graph showing an image density distribution as statistical information, wherein the vertical axis shows the number of pixels and the horizontal axis shows the density characteristic values. In FIG. 3, this image data has characteristics of the total number of pixels: 34,799,360, the maximum number thereof: 240, the minimum number thereof: 15, the mean value thereof: 115, the maximum frequency thereof: 100, the distribution thereof: 10.15, and the number of isolated points: 3,342,751. The conversion of the data using such statistical information is performed in a color space.

The processing in the processing portion 21 can be exemplified by, for example, an operation (OP1) for moving the maximum value of the graph shown in FIG. 3 toward the left side of the graph, an operation (OP2) for emphasizing the contrast by changing the γ characteristic into a steep γ characteristic, and an operation (OP3) for moving the entire waveform of the graph in FIG. 3 toward the left side to decrease the entire density.

The storing portion 23 is comprised of a storing apparatus such as a hard disk for storing the process history (processed contents) or the like at the time of processing the image data in the processing portion 21. For example, the storing portion stores the changed contents of the data or the time at the time of the processing. This storing portion 23 may be provided in a storing server connected to the network 3.

FIG. 4 shows an example of a process history to be stored in the storing portion 23. FIG. 4(A) shows a basic process history, and each item of ID (0-N), the operation contents and the operate time are stored in the processing order. FIG. 4(B) shows a process history in which the operation contents and the operation time are arranged in order of the longer operation time. FIG. 4(C) shows a process history in which the operation contents and the number of operation are arranged in order of the larger number of operation. The process history mentioned above is stored for every certain number of times of operation, or at the time of a certain operation, or at a certain operation time, or after a certain time has passed. The process history is also stored at the time of storing the image data.

The image quality discrimination portion 22 discriminates whether abnormalities occurred after the processing in the processing portion 21, in other words, whether defects are generated in the image data. Concretely, the image quality discrimination portion 22 calculates statistical information as shown in FIG. 3 from the processed image data after the image processing, and then discriminates that the image quality level has reached the level that can be considered as best.

In other words, in cases where the image quality is poor, the image quality discrimination portion 22 discriminates that abnormalities occurred in the image data by the processing. Concretely, in this embodiment, when the distribution of the density characteristic value of the image data is small, it is discriminated that the image quality is poor, because only non-clear image can be obtained when the density characteristic value of the image data is small. Furthermore, in cases where the image data is a color image data, when the distribution value of the saturation component is large, it is discriminated that the image quality is poor since a good image cannot be obtained. Furthermore, in cases where the image data includes a hidden data, if the hidden data is affected by the processing, it is discriminated that the image quality is poor.

The image quality level depends on the gradation nature of the image data and the reproducibility of a display apparatus such as a CRT or an output apparatus such as a printing apparatus. Therefore, the image quality level range may be corrected by using the profile data of the display apparatus or the output apparatus.

The receiving portion 24 receives the image data, etc., transmitted from the terminal 1. Furthermore, as shown in FIG. 2, the transmitting portion 25 transmits the processed contents to the transmit terminal 1 together with the discriminated results in either case where it is discriminated that the image data processed by the data processing apparatus 2 is normal or abnormal.

In the aforementioned image processing system, the image data transmitted from the terminal 1, or the image data and its generation conditions are received by the receiving portion 24 of the data processing apparatus 2, and then the image data is subjected to predetermined processing in the processing portion 21.

After the processing, the image quality discrimination portion 22 discriminates the image quality of the processed image data(i.e., whether abnormalities occurred in the processing). The flow of this image quality discrimination processing will be explained with reference to the flowchart shown in FIG. 5. In the following explanation, a step is abbreviated to "S."

In S101, the statistical information of the image data as shown in FIG. 3 is created about the image data after the processing. Then, in S102, it is discriminated whether the distribution of the density characteristic value of the image data is larger than a predetermined value. If the distribution of the characteristic value of the image data is larger than the predetermined value (YES in S102), the routine proceeds to S103. To the contrary, if the distribution of the characteristic value of the image data is below the predetermined value (NO in S102), it is discriminated that the image quality is poor in S108 since a clear image cannot be obtained, and then the routine proceeds to S109.

In S103, it is discriminated whether the image data is a color image data, and if it is not a color image data (NO in S103), the routine proceeds to S105. To the contrary, if it is a color image data (YES in S103), in S104, it is discriminated whether the distribution of the saturation component of the image data is larger than the predetermined value. If the distribution of the saturation component is larger than the predetermined value (YES in S104), the routine proceeds to S105. To the contrary, if the distribution is below the predetermined value (NO in S104), it is discriminated that the image quality is poor in S108, and the routine proceeds to S109.

In S105, it is discriminated whether the image data includes a hidden data such as watermark information. If there is no hidden data (NO in S105), it is discriminated that the image quality is good in S107, and the routine proceeds to S109. To the contrary, if there is a hidden data (YES in S105), it is discriminated whether there is influence to the hiding data due to the processing in S106.

If there is no influence in the hidden data (NO in S106), it is discriminated that the image quality is good in S107, and the routine proceeds to S109. To the contrary, if there is influence in the hidden data (YES in S106), it is discriminated that the image quality is poor in S108, and the routine proceeds to S109.

In other words, it is discriminated that the image quality is poor when special image data (for example, watermark data, etc.) currently embedded in the image data appears even if the distribution of the density characteristic value of the image data or the distribution of the saturation component of the color image data is large.

Since the holding way of special image data differs depending on the type or amount of the information, the discrimination method may be changed according to the information. Therefore, various discriminations corresponding to the types of information to be held by the image data will be performed.

In cases where the image data includes another image data such as a hidden data disposed in the specific value or the specific configuration, an image quality level discrimination is performed to the image from which the aforementioned another image data is deleted. If the hidden data is emphasized by the processing for improving the image quality of the image data from which the hidden data is deleted, it is discriminated that image quality is not improved.

In S109, the image quality discriminated results, the processed contents (process history), etc. are transmitted to the terminal 1, and the routine is terminated. In other words, if it is discriminated that the image quality is poor, the processed contents and the image data are transmitted to the terminal 1 at the transmitting side together with the notice that the image quality is poor. By this, a user/client can know the processed contents performed in the data processing apparatus 2. Thus, the user can efficiently regenerate the image data depending on the processed contents, which can avoid a wasteful regeneration job and lessen the burden.

In this embodiment, even in cases where it is discriminated that the image quality is good, the processed contents are transmitted. However, the processed contents may be transmitted only when it is discriminated that the image quality is poor. Furthermore, in cases where the image data is backed up in the terminal 1, the transmission of the image data may be omitted.

Now, in the aforementioned example, the image quality discrimination portion 22 discriminates the image quality judging from the received entire image data. However, it may be discriminated whether the entire image data is good by dividing the received image data into a plurality of areas and judging the image quality for every divided area based on the ratio of the divided area discriminated as good to the entire area.

For example, as shown in FIG. 6, the received image data VD1 is divided into a plurality of areas A00-ALN in the shape of a matrix, and the image quality discrimination is performed for every divided image area A00-ALN. In this figure, it is discriminated that the divided areas A11, A32 and AL3 are discriminated as poor, and the remaining areas are discriminated as good. Based on the discriminated results, it may be discriminated whether the entire image quality is good. According to this case, the discrimination precision of the image quality can be enhanced.

Figure 7:
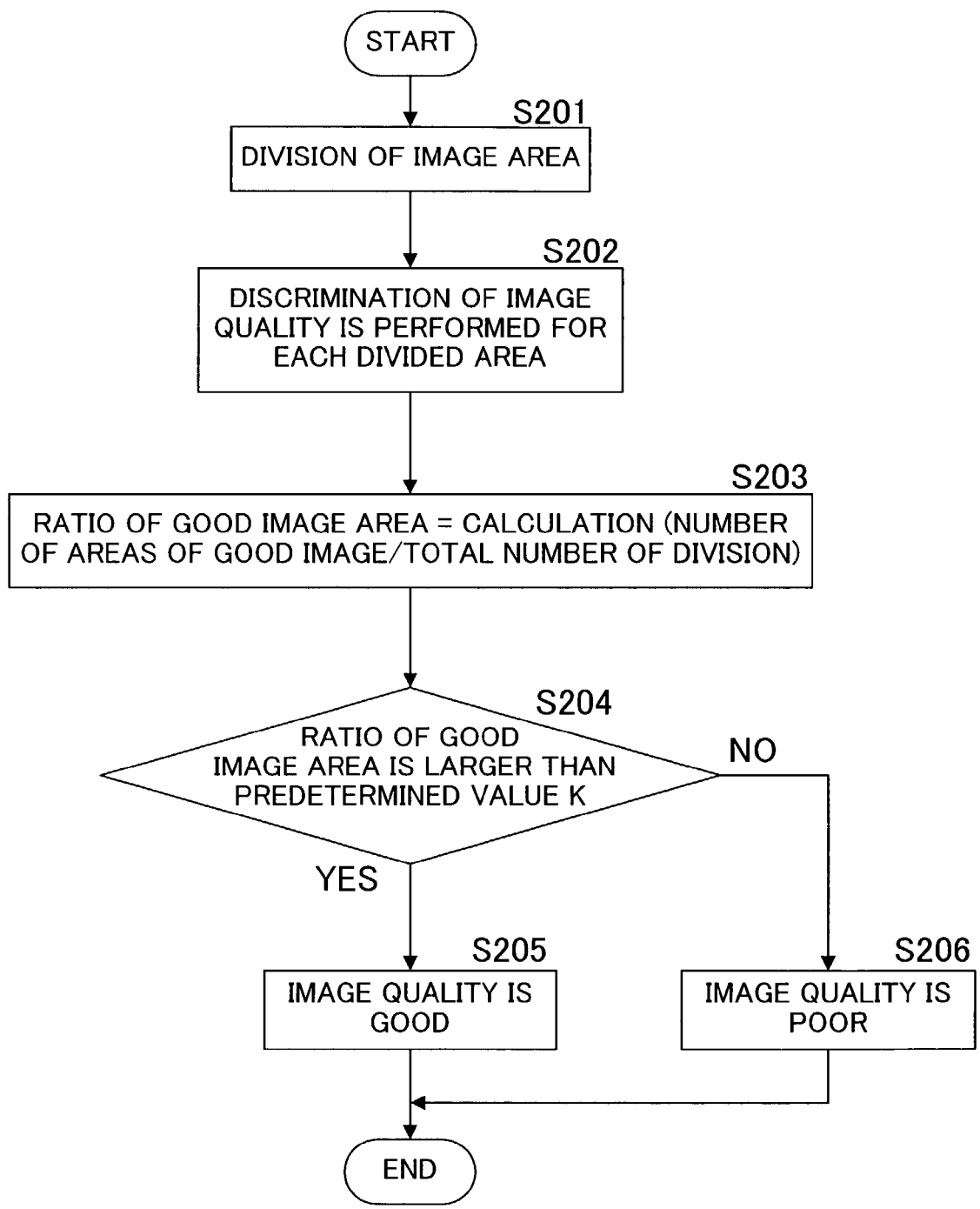
FIG. 7 is a flowchart showing the flow of image quality discrimination processing in which an image data area is divided.

The flow of the image quality discrimination processing in the case of dividing the area will be explained with reference to FIG. 7.

First, in S201, the received image data is divided into a plurality of areas A00-ALN as shown in FIG. 6. Then, in S202, the discrimination of the image quality is performed for each divided area A00-ALN. The discrimination of the image quality follows the flow of the processing shown in FIG. 5.

In S203, the ratio of the number of areas discriminated that the image quality is good by the discrimination to the number of divisions is calculated. In S204, it is discriminated whether the calculated ratio is larger than the predetermined ratio K that it is discriminated that the image quality is good. The predetermined ratio K that it is discriminated that the image quality is good changes depending on the property of the target image data, concretely color/monochrome, image size, resolution, gradients, etc.

If the calculated ratio is larger than the predetermined ratio K that it is discriminated that the image quality is good (YES in S204), the processing for a good image quality is performed in S205, and the routine is terminated. By this processing, the results of "good image quality," etc. is transmitted to the terminal 1. If the calculated ratio is below the predetermined ratio K that it is discriminated that the image quality is good (NO in S204), the routine is terminated after the processing for the poor image quality in S206, and then the routine is terminated. By this, the results of "poor image quality" and the processed contents, etc. are transmitted to the terminal 1.

Figure 8:
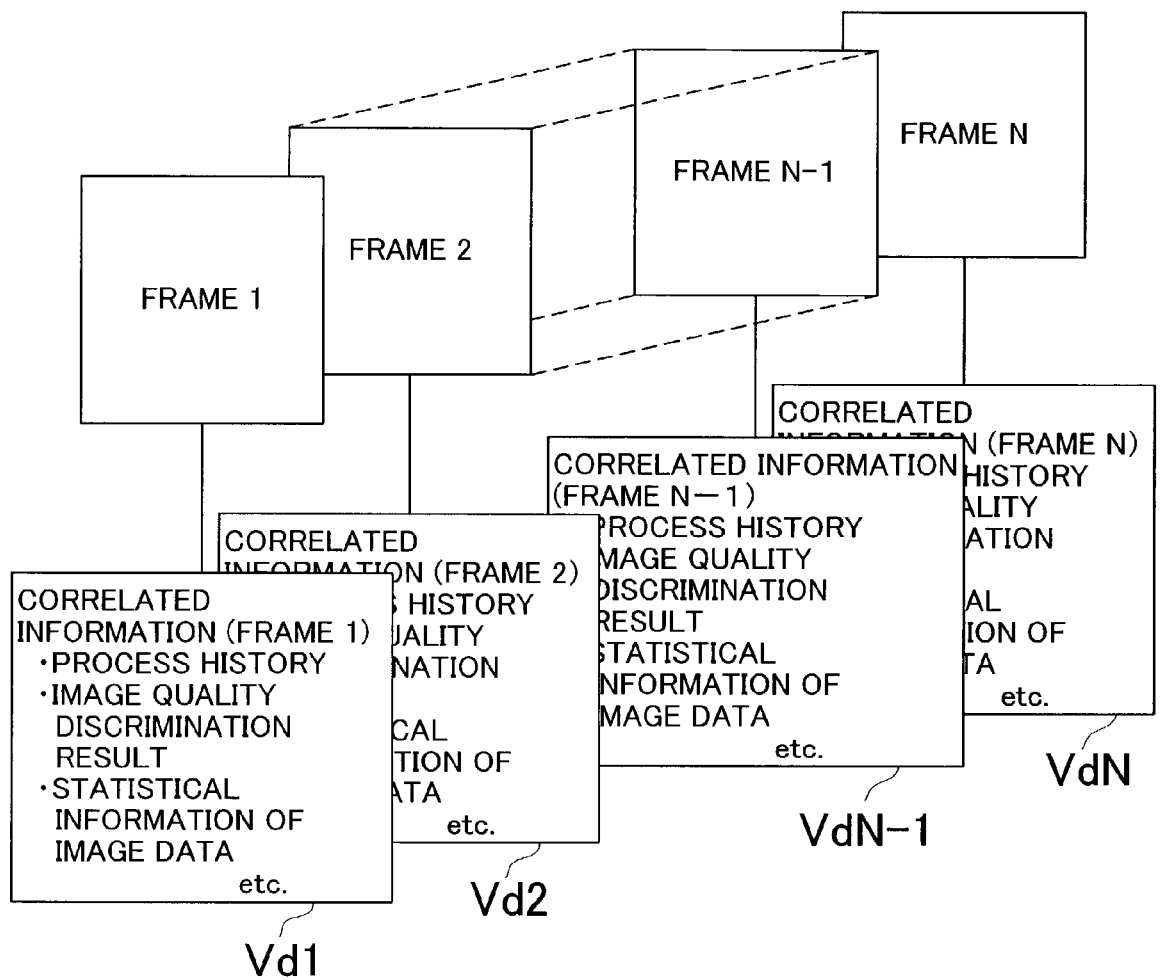
FIG. 8 is an explanatory drawing showing image quality discrimination of a dynamic image.

FIG. 8 is an explanatory drawing showing an image quality discrimination processing for a dynamic image data.

In case of a static image data, the data includes the correlated information such as the process history, the image quality discrimination results and statistical information for each image unit. To the contrary, in case of a dynamic image data (the number of frames N), the data includes correlated information Vd1, Vd2 . . . VdN per one-frame unit or plural-frame units. These correlated information are stored in the storing portion 23.

The image quality of dynamic image is discriminated by majority basically. In other words, even in cases where the image quality level of a certain frame is low, if the image quality level of the other frames is high and the level difference thereof is within tolerance, it is discriminated that the image quality level is high. However, if an image of a specific frame is deteriorated remarkably, the image quality level difference exceeds the tolerance. Therefore, in order to improve the image quality of the frame, it is discriminated that the image quality level is low as a whole.

As for a dynamic image, in the similar manner as in the aforementioned case, the image may be divided into a plurality of areas for each frame and may be discriminated for each divided area to discriminate the image quality of the entire frame.

Figure 9:
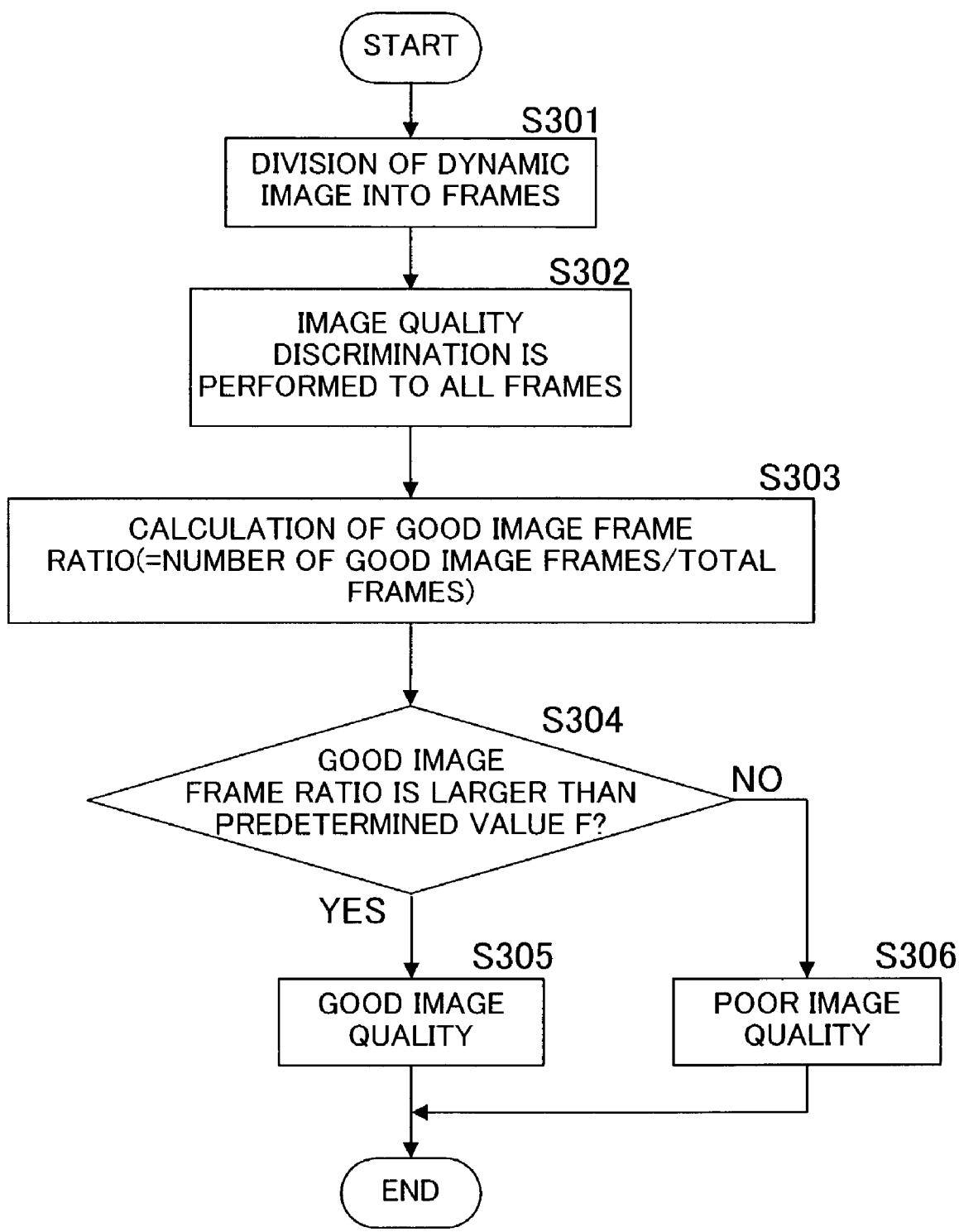
FIG. 9 is a flowchart showing the flow of image quality discrimination processing of a dynamic image.

The flow of the processing for discriminating the image quality of the aforementioned dynamic image data will be explained with reference to the flowchart shown in FIG. 9.

First, in S301, the received dynamic image is divided into plural frames, and in S302 the discrimination of image quality is performed to all of the frames. The discrimination of the image quality follows the aforementioned processing shown in FIG. 5.

In S303, the ratio of the number of frames which are discriminated that the image quality is good by the discrimination to the total number of frames is calculated. In S304, it is discriminated whether the calculated frame ratio is larger than the predetermined ratio F that it is discriminated that the entire image quality is good. The predetermined ratio F that it is discriminated that the image quality is good changes depending on the property of the target image data, concretely color/monochrome, image size, resolution, gradients, etc.

If the calculated frame ratio is larger than the predetermined ratio F that it is discriminated that the image quality is good (YES in S304), the processing for a good image quality is performed in S305, and the routine is terminated. By this processing, the results of "good image quality," etc. is transmitted to the terminal 1. If the calculated frame ratio is below the predetermined ratio F that it is discriminated that the image quality is good (NO in S305), the routine is terminated after the processing for the poor image quality in S306, and then the routine is terminated. By this, the results of "poor image quality" and the processed contents, etc. are transmitted to the terminal 1.

Next, the second embodiment of the present invention will be explained with reference to the attached drawings.

Figure 10:
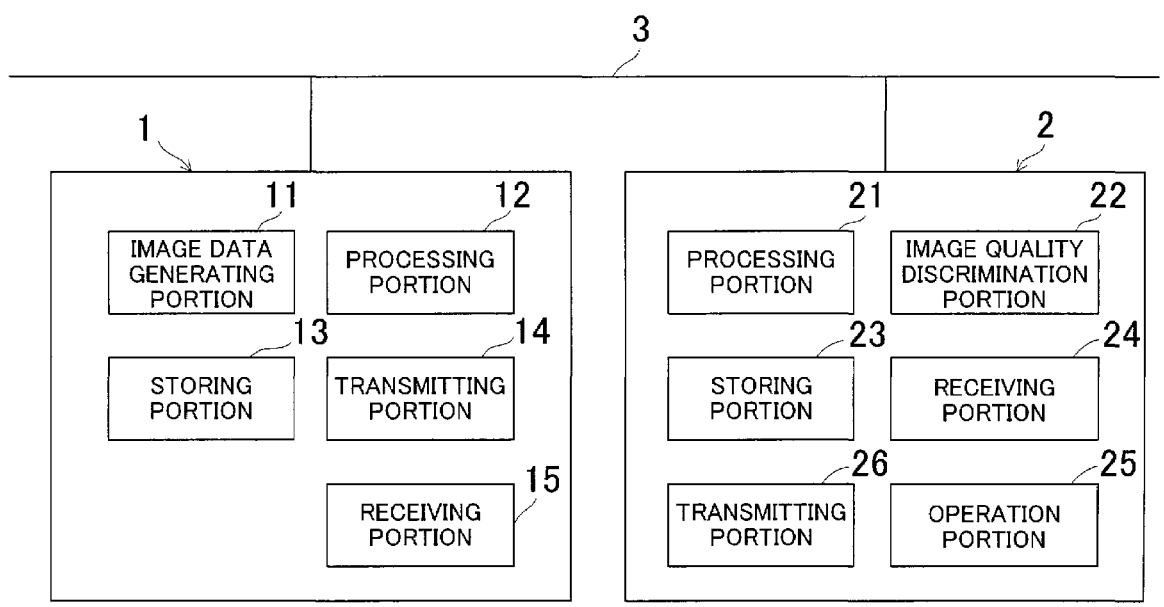
FIG. 10 is an entire structural view showing an image processing system equipped with a data processing apparatus according to the second embodiment of the present invention.

FIG. 10 is an entire structural view showing an image processing system equipped with a data processing apparatus according to the second embodiment of the present invention. The same reference numeral will be allotted to the same or corresponding portion in FIG. 1 and the explanation will be omitted.

The system shown in FIG. 10 is different from the system shown in FIG. 1 in that the data processor 2 is equipped with an operation portion 26.

The operation portion 26 calculates generation conditions of an image data required in order to process the image so that a poor image quality does not occur in cases where the image quality discrimination portion 22 discriminates that the image quality of the processed image data is poor (in cases where it is discriminated that abnormalities occurred by the processing).

Figure 11:
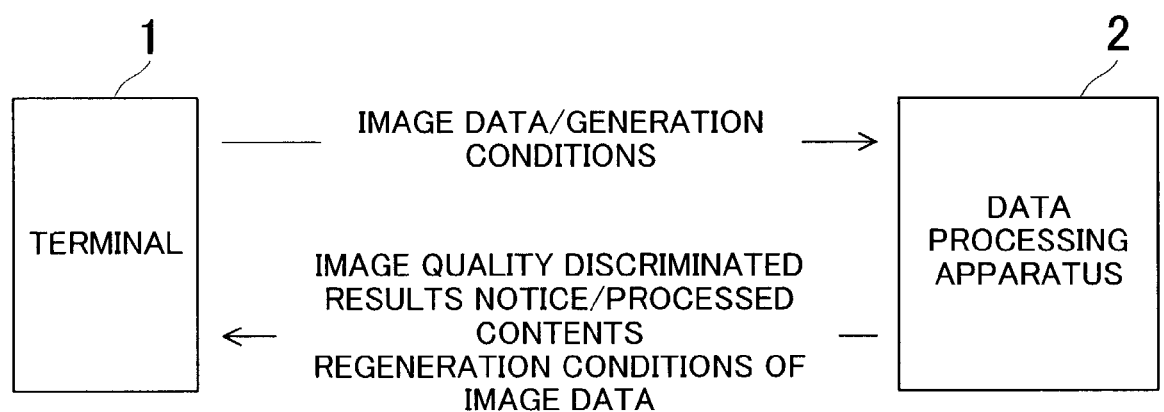
FIG. 11 shows the data flow in the image processing system.

In cases where it is discriminated that the image quality is poor, as shown in FIG. 11, the transmitting portion 25 transmits the discriminated results that the image quality is poor, the processed contents and the regeneration conditions by the operation portion 26 to the terminal 1.

The image quality discrimination by the image quality discrimination portion 22 and the operation for the image regeneration conditions by the operation portion 26 are performed by the following procedure. First, as shown in FIG. 12(A), an image quality discrimination portion 22 checks the conditions which can discriminate that the transmitted image data VD1 is good in order of the significance which influences image quality. Concretely, in order of the significance, it is checked, for example, (1) whether the distributed value of the density component exceeds the predetermined value, (2) whether the distributed value of the saturation component exceeds the predetermined value, . . . (N) whether it is overlapped with the hidden data area. If there are conditions by which it is not discriminated that the image quality is good, it is discriminated that the image quality is poor. The list of image quality discrimination results is shown in FIG. 12 (A). In this example, the discrimination item on whether the distributed value of the saturation component exceeds the predetermined value is discriminated as NG.

Although these checks are fundamentally performed to all conditions, in cases where the image quality becomes poor under important conditions, the checks of the remaining conditions may be omitted.

Next, based on the discrimination results of the image quality, regarding the items which are discriminated as poor, for example, the items on whether the distributed value of the saturation component exceeds the predetermined value S, as shown in FIG. 12(B), it is discriminated whether there is a change in each item such as the sensitivity of R component, G component and B component, which are related regeneration conditions, etc. Furthermore, as for the numerals to be changed such as service adjustment value, a suitable value is calculated from the image quality evaluation results.

The suitable value may be obtained from the table information including predetermined values to the poor values, or may be calculated from the evaluation value each time.

In FIG. 12 (B), the re-operations of service adjustments 1, 2 . . . are shown as regeneration conditions. Concretely, these are adjustments in connection with image quality including adjustments of optical systems such as an adjustment of intensity of a lamp or an adjustment of a clamp gain, an adjustment of an automatic setting value for skipping the substrate, an adjustment of γ-curve and an adjustment of a white balance, etc.

Furthermore, these adjustments are not limited to automatic adjustments by software or hardware, but may be manual adjustments. In case of manual adjustments, the adjustment value may be set beyond the automatic adjustment range.

In the aforementioned image processing system according to the second embodiment, the image data transmitted from the terminal 1, or the image data and its generation conditions are received by the receiving portion 24 of the data processing apparatus 2, and then the image data is subjected to predetermined processing in the processing portion 21.

After the processing, the image quality discrimination portion 22 discriminates the image quality of the processed image data (i.e., whether abnormalities occurred in the processing). If the image quality is poor, the regeneration conditions of the image data are calculate by the operation portion 26. The flow of this image quality discrimination processing and the calculation processing will be explained with reference to the flowchart shown in FIG. 13.

In S401, the image quality discrimination portion 22 creates the statistical information of the processed image data. Then, in S402, it is discriminated whether the distribution of the characteristic value of the image data (density components) is larger than a predetermined value. If the distribution of the characteristic value of the image data is larger than the predetermined value (YES in S402), the routine proceeds to S403. To the contrary, if the distribution of the characteristic value of the image data is below the predetermined value (NO in S402), it is stored in the storing portion 23 that the image quality is poor in S408 since a clear image cannot be obtained, and then the routine proceeds to S403.

In S403, it is discriminated whether the image data is a color image data, and if it is not a color image data (NO in S403), the routine proceeds to S405. To the contrary, if it is a color image data (YES in S403), in S404, it is discriminated whether the distribution of the saturation component of the image data is larger than the predetermined value. If the distribution of the saturation component is larger than the predetermined value (YES in S404), the routine proceeds to S405. To the contrary, if the distribution is below the predetermined value (NO in S404), it is stored in the storing portion 23 that the image quality is poor in S409, and the routine proceeds to S405.

In S405, it is discriminated whether the image data includes a hidden data such as watermark information. If there is no hidden data (NO in S405), the routine proceeds to S407. To the contrary, if there is a hidden data (YES in S405), it is discriminated whether there is influence to the hiding data due to the processing in S406.

If there is no influence to the hidden data (NO in S406), the routine proceeds to S407. To the contrary, if there is influence to the hidden data (YES in S406), it is stored in the storing portion 23 that the image quality is poor in S410, and the routine proceeds to S407.

In S407, it is discriminated whether there was any item showing a poor image. If there is no item showing a poor image (YES in S407), the image discriminated results and the process history (the processed contents) executed to the image data are transmitted to the terminal 1 at the transmitting side in S411. To the contrary, in S412, even if there is only one item showing a poor image (NO in S407), the operation portion 26 calculates the conditions for performing the regeneration of the image. Then, the regeneration conditions of image data are transmitted to the terminal 1 together with the image discriminated results, the process history executed to the image data, etc.

In this embodiment, in cases where the processed image data is poor, the operation portion 26 calculates the regeneration conditions of the image data, and the calculated regeneration conditions are transmitted to the terminal 1. Therefore, the regeneration conditions of this image data can be known, enabling efficient regeneration of image data based on the regeneration conditions, which can avoid wasteful regeneration jobs.

Figure 13:
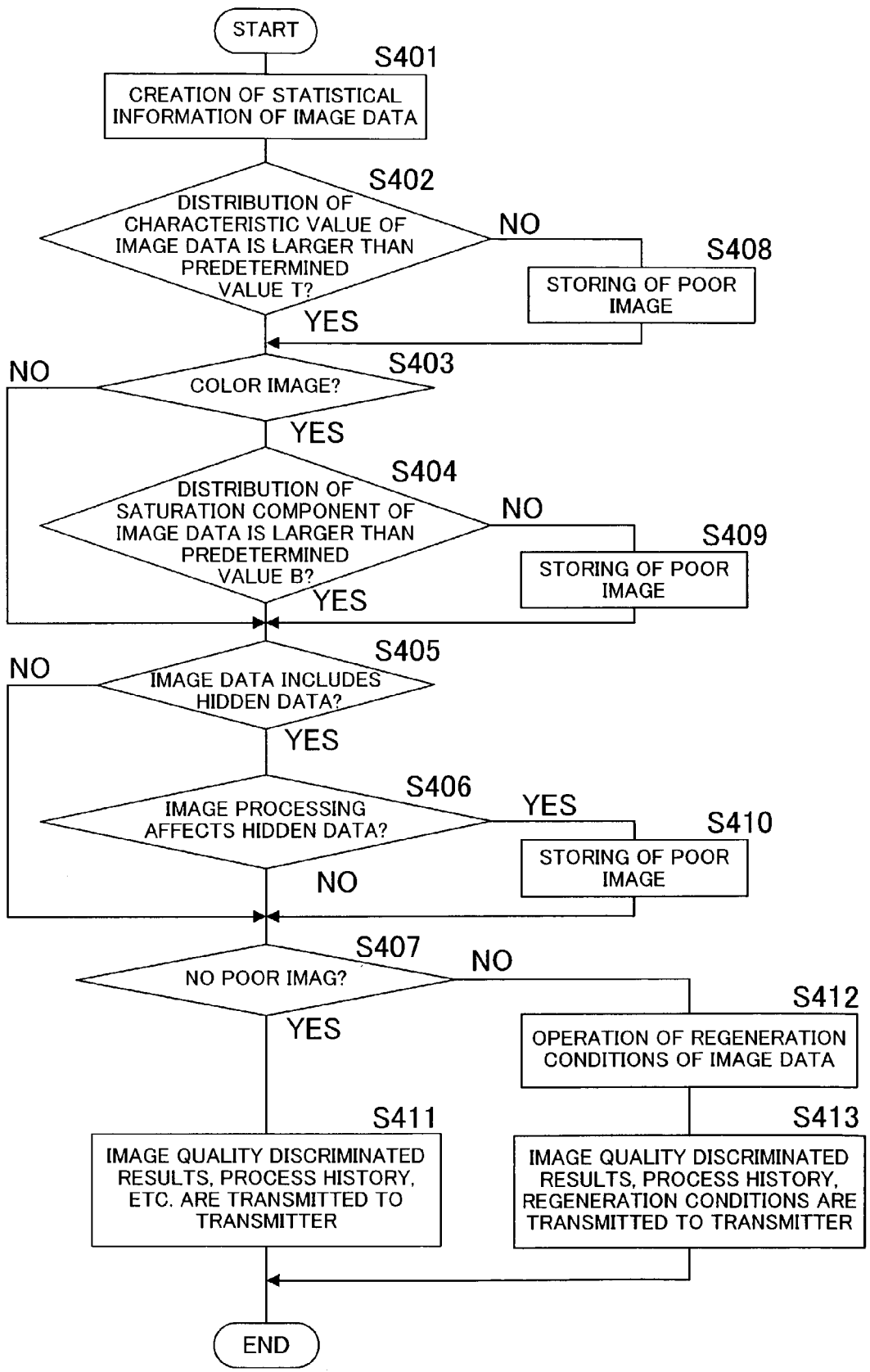
FIG. 13 is a flowchart showing a flow of image quality discrimination processing of an image data for creating regeneration conditions.

In the processing shown in FIG. 13, in cases where it discriminated that the image is poor, it is stored that the image is poor each time, and the regeneration conditions of the image data are calculated about the item on the poor image quality after the discrimination of all items and then transmitted to the terminal 1. However, in the same way as in the processing shown in FIG. 5, if it is discriminated that at least one image is poor, the regeneration conditions of the image data may be calculated each time and transmitted to the terminal 1.

Next, the third embodiment of the present invention will be explained with reference to the attached drawings.

Figure 14:
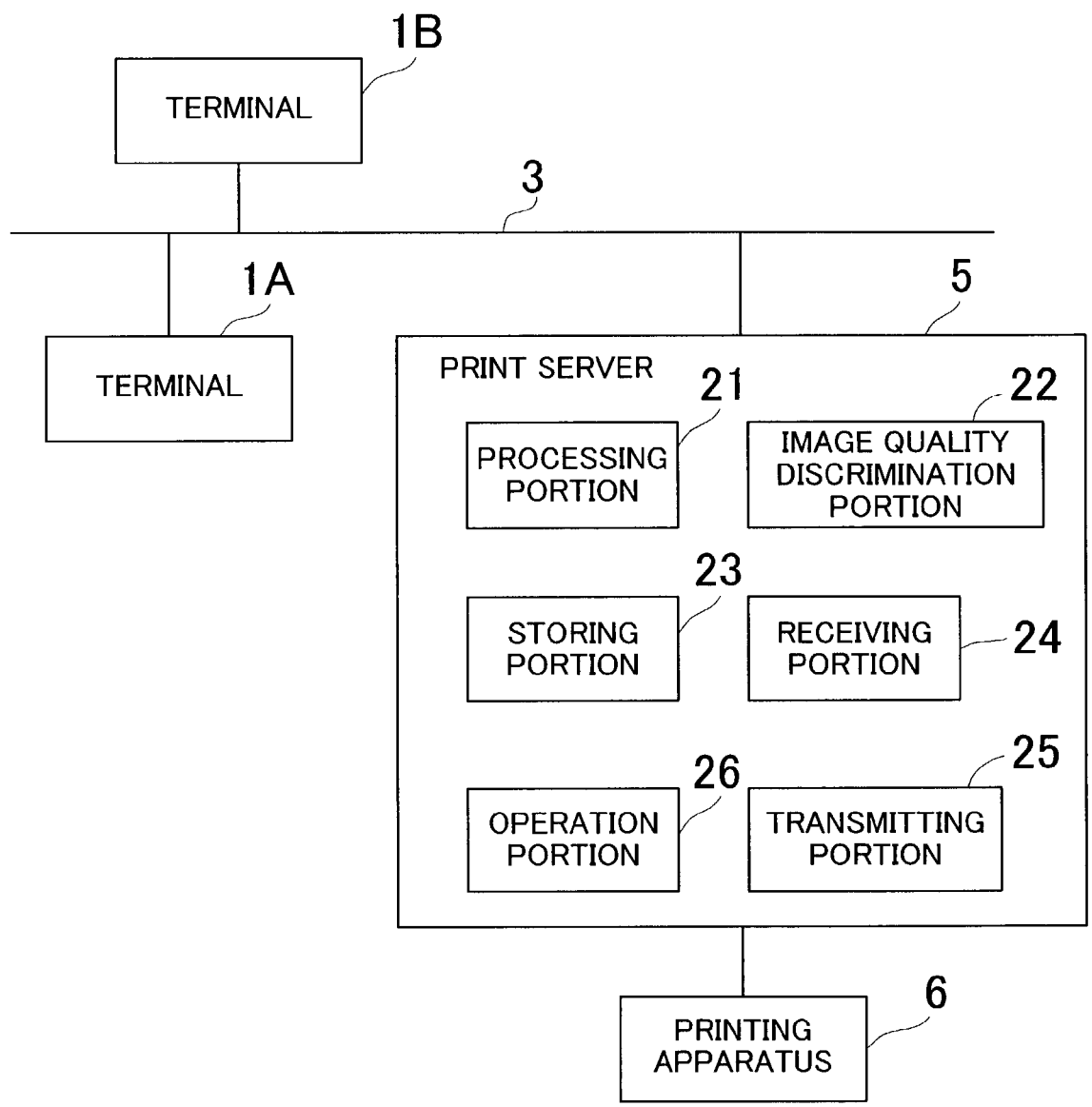
FIG. 14 is an entire structural view showing a print service system equipped with a data processing apparatus according to the third embodiment of the present invention.

FIG. 14 is an entire structural view showing a print service system equipped with a data processing apparatus according to the third embodiment of the present invention. The same reference numeral will be allotted to the same or corresponding portion in FIGS. 1 and 10 and the explanation will be omitted.

In FIG. 14, the print service system is equipped with terminal 1 (1A, 1B) corresponding to a plurality of users/clients, a print server 5 which is a data processing apparatus (hereinafter referred to as a server), and a printing apparatus 6 which outputs the image data processed by the data processing apparatus. The terminal 1 (1A, 1B) and the server 5 are connected to the network 3. Although the printing apparatus 6 is connected with and controlled by the server 5, the printing apparatus 6 may be connected to the network and controlled through the network.

Similar to the first embodiment shown in FIG. 1, the server is equipped with a processing portion 21, an image quality discrimination portion 22, a storing portion 23, a receiving portion 24, a transmitting portion 25 and an operation portion 26 like the second embodiment shown in FIG. 10.

In this embodiment, when the image data is transmitted to the server 5 from the terminal 1, the server 5 processes the image data by the processing portion 21.

The image quality discrimination portion 22 discriminates the image quality of the image data after the processing. Concretely, the image quality discrimination portion 22 of the server 5 calculates the fluctuation range of the image quality of the image data after the processing, and discriminates whether the image quality fluctuation range is within the area where it is discriminated that the image quality is good, to thereby discriminate the image quality. This discrimination can be performed in the same manner as in the first and second embodiments.

In cases where it is discriminated that the image quality is good, the server 5 transmits the processed image data to the printing apparatus 6 so that the printing apparatus can print it. Furthermore, if necessary, the discriminated results, the contents of processing, etc. may be transmitted to the client terminal 1.

In cases where it is discriminated that the image quality is poor, the operation portion 26 calculates the statistical difference between the initially submitted image data and the image data of a good image quality, as regeneration conditions of the image data for improving the image quality after the processing, and the transmitting portion 25 transmits the image quality discriminated results, the contents of the processing, the regeneration conditions, etc. to the client terminal 1 (1A, 1B), as shown in FIG. 6. The image quality discriminated result, the processing work contents, etc. may be transmitted without transmitting the regeneration conditions of the image data.

At the client terminal 1 (1A, 1B), the image data is regenerated based on the transmitted regeneration conditions and/or the contents of the processing. When the regenerated image data is retransmitted to the server 5, in the server 5, the image data is reprocessed and then transmitted to the printing apparatus 6 so that the printing apparatus can print it if the quality of the image is good.

Figure 15:
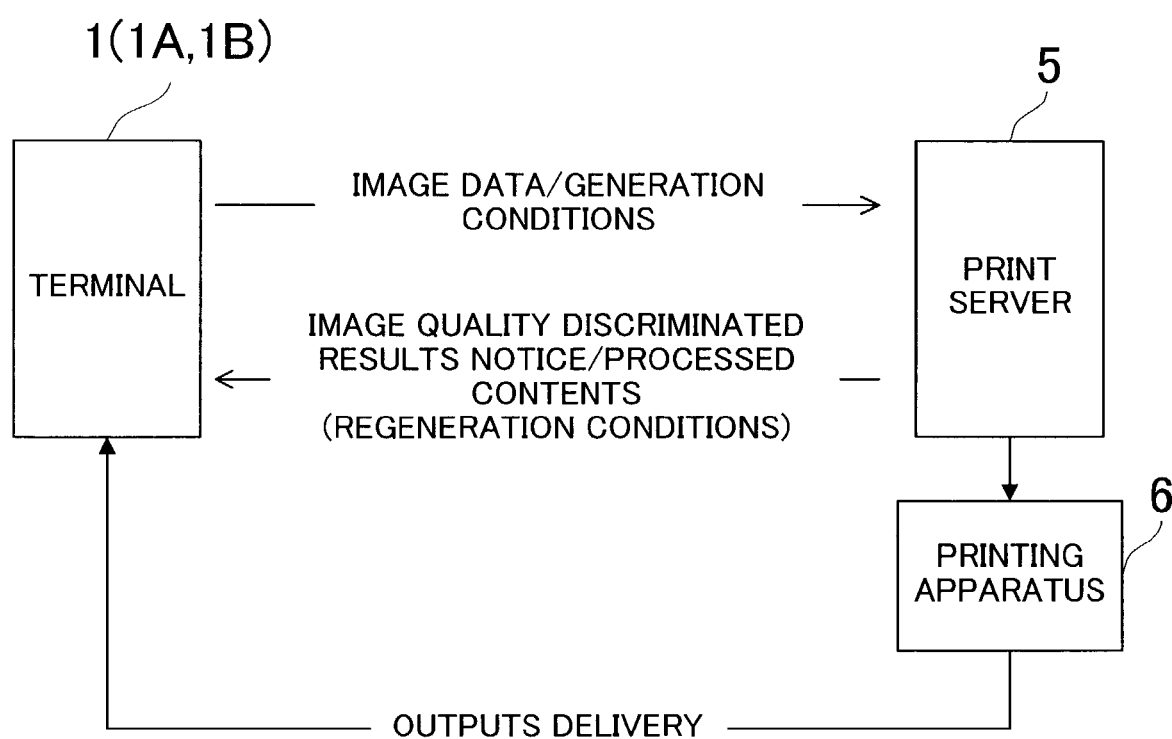
FIG. 15 shows a data flow in the print service system.

The output object from the printing apparatus 6 is delivered through a predetermined delivery means to the client terminal 1 (1A, 1B) (FIG. 15).

The contents of the processing executed to image data in the server 5 are stored in the storing portion 23 sequentially, and also transmitted to the client terminal 1. In cases where the contents of the processing are transmitted to the terminal 1, in order to reduce the amount of information, the information regarding the data difference Δ(Xn, Ym) between the value A (Xn, Ym) of the image data VDa after the processing and the value B (Xn, Ym) of the image data VDb before the processing in arbitrary coordinates (Xn, Ym) and the information of the main job executed in the processing may be transmitted.

Figure 16:
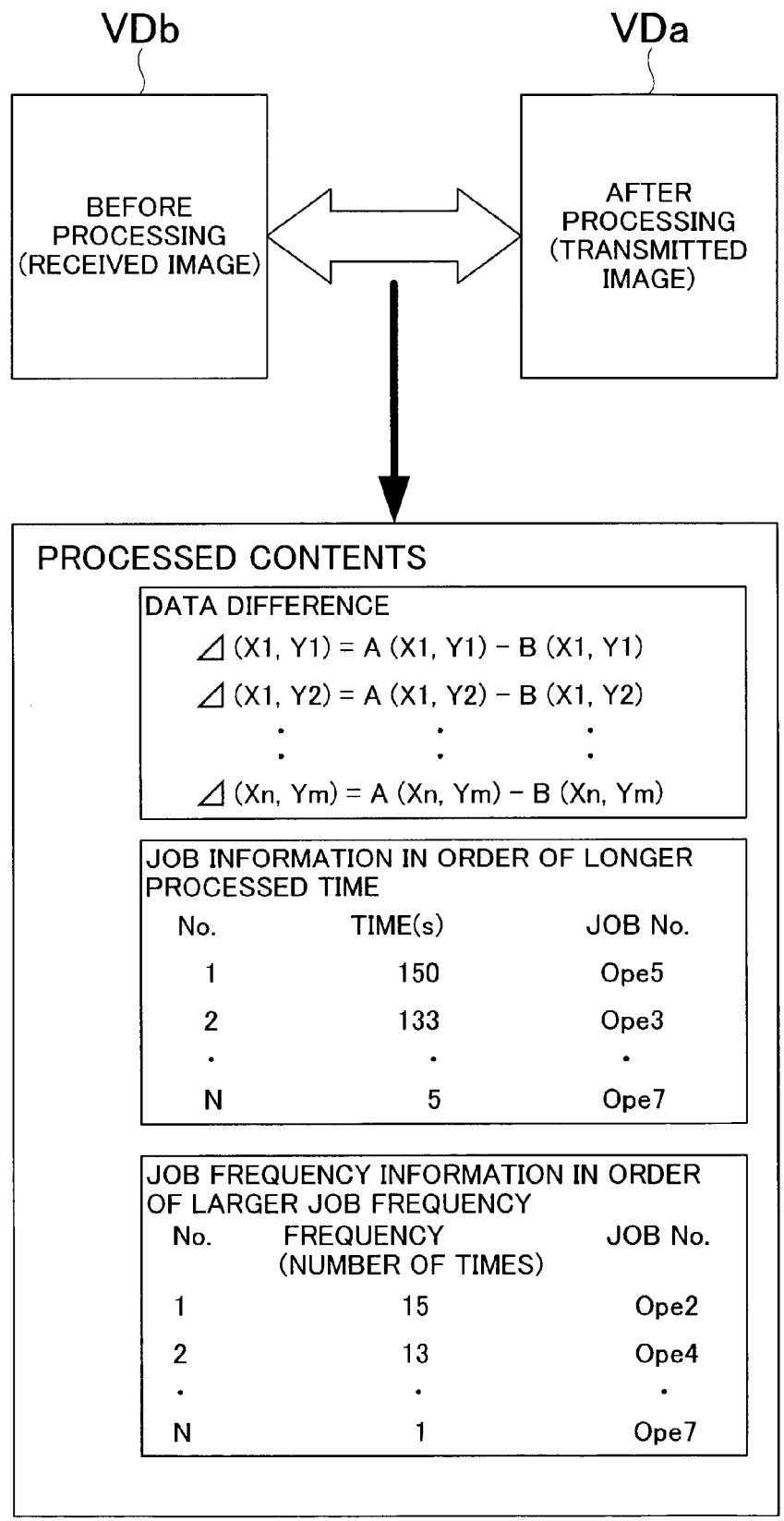
FIG. 16 is an explanatory drawing of processed contents of the image data.

The information of the main job may be obtained by creating the work content lists (see FIG. 16) arranged in order of longer working time by using the job information stored in the aforementioned storing portion 23, or creating the job contents lists (see FIG. 16) arranged in order of frequency of the job repeatedly performed.

Next, the fourth embodiment of the present invention will be explained with reference to the attached drawings.

Figure 17:
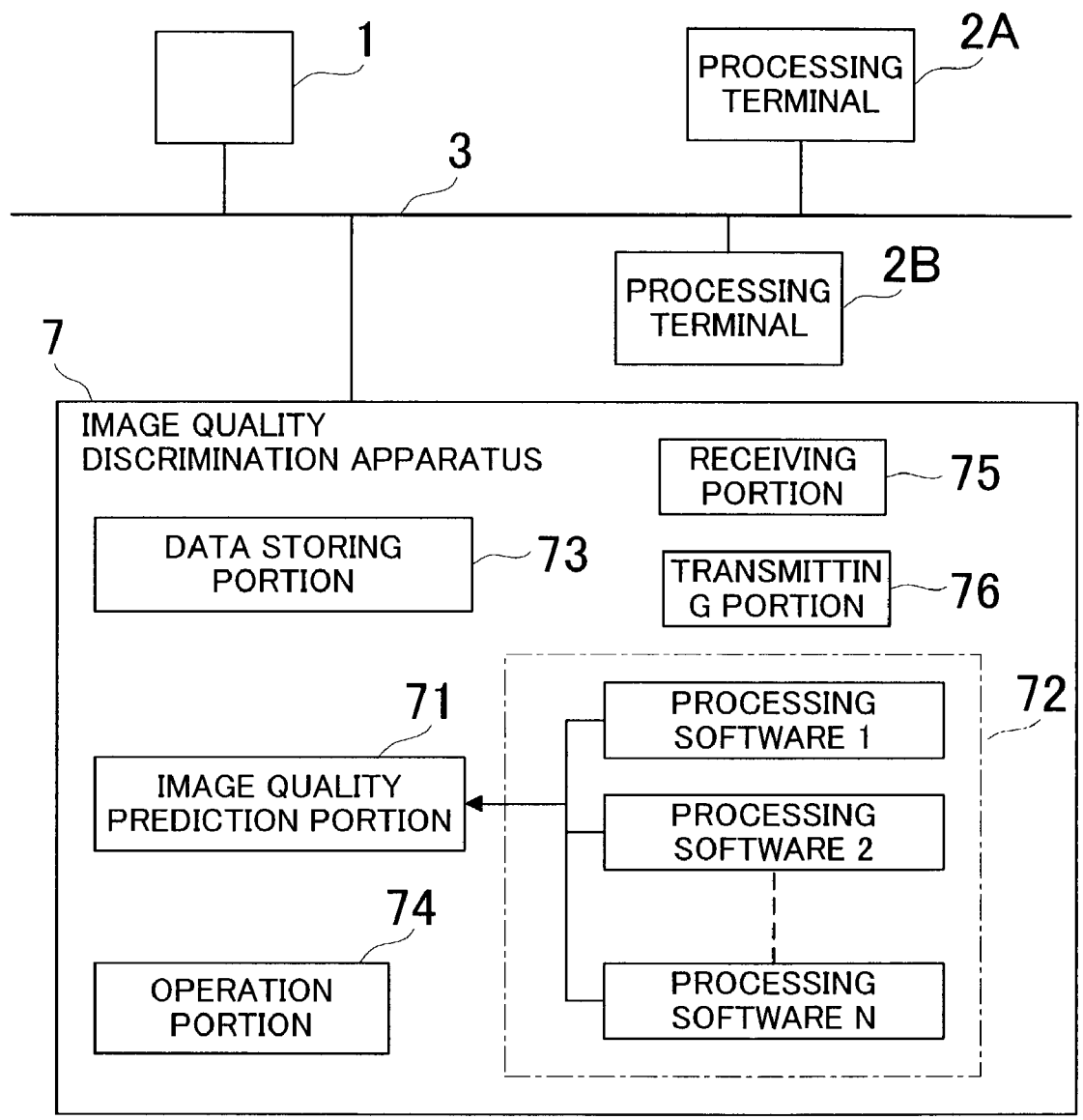
FIG. 17 is an entire structural view showing an image processing system equipped with a data processing apparatus according to the fourth embodiment of the present invention.

FIG. 17 is an entire structural view showing an image processing system according to the fourth embodiment of the present invention. The same reference numeral will be allotted to the same or corresponding portion in FIG. 1 and the explanation will be omitted.

In FIG. 17, this image processing system includes a terminal 1 at a user or client side, processing terminals 2A and 2B and an image quality discrimination apparatus 7 as a data processing apparatus which are connected to a network 3.

The processing terminals 2A and 2B perform predetermined processing to the image data transmitted from the terminal 1. The image quality discrimination apparatus 7 predicts whether abnormalities occur by processing operation before the processing is performed by the processing terminal 2A, 2B or other processing apparatus (whether the image quality after the processing is poor) These are constituted by computers.

The image quality discrimination apparatus 7 is equipped with an image quality prediction portion 71, a software storing portion 72, a data storing portion 73, an operation portion 74, a receiving portion 75 and a transmitting portion 76.

The prediction portion 71 has a function which predicts whether the image quality of the image data becomes poor due to the processing before processing the image data created by the terminal 1 by the processing terminal 2A, 2B and another processing apparatus.

The software storing portion 72 stores all of the software 1-N which can perform processing of image data. Furthermore, the data storing portion 73 stores the transmitted image data and the information relevant to the software currently used by the processing terminals 2A, 2B or the software currently used at the terminal 1.

The operation portion 74 calculates the regeneration conditions of the image data required to become good image quality in cases where the image quality prediction portion 71 predicts that the image data after the processing becomes poor (in cases where it is predicted that abnormalities occur by the processing).

The receiving portion 75 receives the data sent from the terminal 1 and so on. The transmitting portion 25 transmits image quality discriminated results, etc. to the terminal 1.

In the aforementioned image processing system, when the image data transmitted from the terminal 1 or the image data and the generation conditions are received by the receiving portion 75 of the image quality discrimination apparatus 7, the image quality prediction portion 71 predicts the image quality which is assumed that processing is executed to the image data.

The prediction is performed by calculating the statistical information as shown in FIG. 3 from the image data and discriminating whether the image quality is improved by the processing based on the statistical information and the information on the software used for the processing of the image data. Alternatively, the image quality may be predicted by calculating the processing range of the image data from the statistical information of the calculated image data, the function or version information on the software used for the processing, calculating the image quality level range of the image after the processing from the calculated processible range, and discriminating whether the image quality has reached the level which can be regarded as the best image quality among the calculated image quality level ranges.

The image quality level depends on the gradation nature of the image data and the reproducibility of the output unit such as a displaying apparatus, e.g., a CRT or a printing apparatus. Therefore, the image quality level range may be amended by using the profile data of the displaying apparatus or the output apparatus.

The prediction of the image quality is performed about all of the software 1-N which can perform the processing of the image data. However, since the software used for image creation or processing usually differs for every terminal 1 and the processing terminal 2A and 2B, the discrimination may be limited to the software of the processing terminal 2A, 2B or to the specific software for the user or client with reference to the software related information stored in the storing portion 73.

If the image quality prediction portion 71 predicts that the image quality is poor, the prediction and the predicted processing contents by the software, etc. are transmitted to the terminal 1 through the transmitting portion 76 in the same manner as in the first embodiment. Alternatively, in the same manner as in the second embodiment, the regeneration conditions of the image data for obtaining good processing results are calculated by the operation portion 74, and then the predicted results, the processing contents, the regeneration conditions, etc. are transmitted to the terminal 1.

Figure 5:
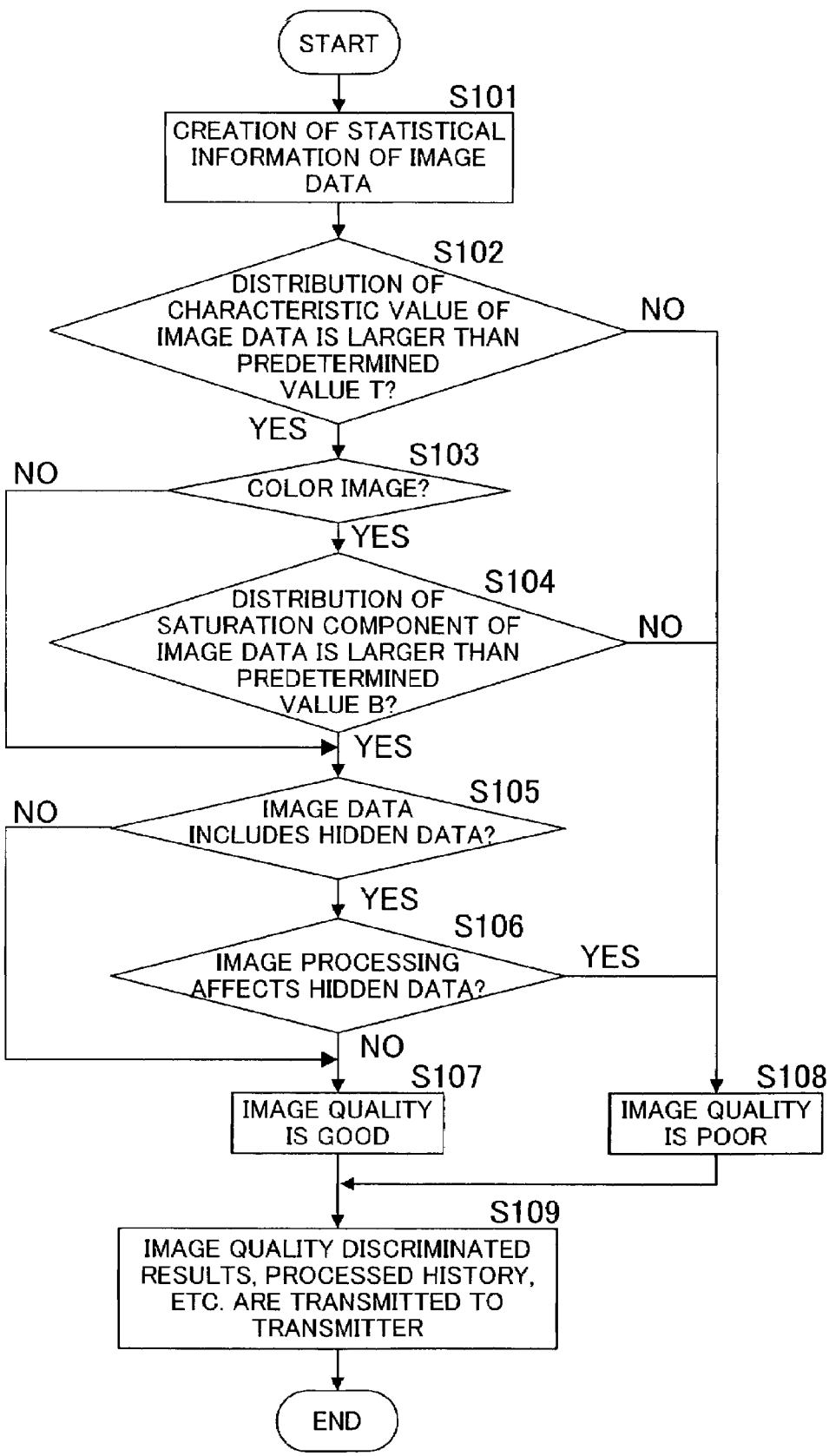
FIG. 5 is a flowchart showing a flow of quality discrimination processing of an image data.

The flow of the processing such as the image quality discrimination or the operation of the regeneration conditions in the image quality discrimination apparatus 7 is the same as in the first embodiment shown in FIG. 5 and the second embodiment in FIG. 13. Therefore, the explanation will be omitted.

As mentioned above, since the image quality discrimination is performed by the image quality discrimination apparatus 7 assuming that the processing is performed before the actual processing by the processing terminals 2A, 2B, it is not necessary to perform the once performed processing again due to the poor image quality, which reduces the burden of the processing terminal 2A, 2B.

Although preferred embodiments of the present invention were explained above, a method of discriminating image quality or a method of calculating regeneration conditions of an image data is not limited to the aforementioned embodiments. Furthermore, the image quality discrimination by the area division and the image quality discrimination in the case of dynamic image data as explained in the first embodiment are also applicable to the second to the fourth embodiment.

The terms and descriptions in this specification are used only for explanatory purposes and the present invention is not limited to these terms and descriptions. It should be appreciated that there are many modifications and substitutions without departing from the spirit and the scope of the present invention which is defined by the appended claims. A present invention permits any design-change, unless it deviates from the soul, if it is within the limits by which the claim was performed.

What is claimed is:

1. A data processing apparatus, comprising:
   a receiver which receives a data transmitted from a terminal;
   a processor which processes the data received by said receiver;
   a discriminator which determines if the processing by said processor results in a quality of the processed data being below a predetermined quality; and
   a transmitter which transmits information related to the processing by said processor to said terminal when said discriminator determines that the quality of the processed data is below the predetermined quality.

2. The data processing apparatus as recited in claim 1, wherein the discriminator determines if abnormalities occur due to the processing by said processor, and wherein said transmitter transmits processed contents to said terminal when said discriminator determines that abnormalities occur.

3. The data processing apparatus as recited in claim 1, wherein the data is an image data, and wherein said discriminator discriminates image quality after said processing.

4. The data processing apparatus as recited in claim 3, wherein said discriminator divides the image data received by said receiver into a plurality of areas and discriminates the image quality for every area.

5. The data processing apparatus as recited in claim 2, wherein the data is an image data, and wherein said discriminator discriminates whether there is an influence on hidden data caused by the processing.

6. The data processing apparatus as recited in claim 1, further comprising prediction means which predicts whether abnormalities occur due to processing by said processor, wherein said transmitter transmits processed contents to said terminal when said prediction means predicts that abnormalities occur.

7. The data processing apparatus as recited in claim 1, wherein the information related to the processing by said processor comprises the processing history.

8. The data processing apparatus as recited in claim 1, wherein the information related to the processing by said processor comprises the processed contents.

9. The data processing apparatus as recited in claim 3, wherein the discriminator determines if the processing by said processor results in a level of quality of the processed data being below a predetermined level of quality based on a distribution of a characteristic value of the image data.

10. The data processing apparatus as recited in claim 3, wherein the discriminator determines if the processing by said processor results in a level of quality of the processed data being below a predetermined level of quality based on a distribution of a saturation component of the image data.

11. A data processing apparatus, comprising:
a receiver which receives a data transmitted from a terminal;
a processor which processes the data received by said receiver;
a discriminator which discriminates whether abnormalities occur due to processing by said processor;
a calculator which calculates conditions for regenerating the data which do not cause abnormalities even if said processor processes the data when said discriminator discriminates that abnormalities occur; and
a transmitter which transmits the conditions calculated by said calculator to said terminal.

12. The data processing apparatus as recited in claim 11, wherein said discriminator predicts whether abnormalities occur by processing by said processor prior to the processing.

13. A data processing method, comprising:
receiving data transmitted from a terminal;
processing a received data;
determining whether abnormalities occurred as a result of said processing of the received data; and
transmitting processed contents to said terminal when it is determined that abnormalities occur.

14. A data processing method, comprising:
receiving a data transmitted from a terminal;
processing the received data;
determining whether abnormalities occur due to the processing of the data;
calculating conditions for regenerating the data that do not cause abnormalities when it is determined that abnormalities occur; and
transmitting the calculated conditions to said terminal.

* * * * *